April 13, 1954 — M. F. MENG — 2,675,247
VEHICLE CHASSIS CONSTRUCTION
Filed Aug. 1, 1949
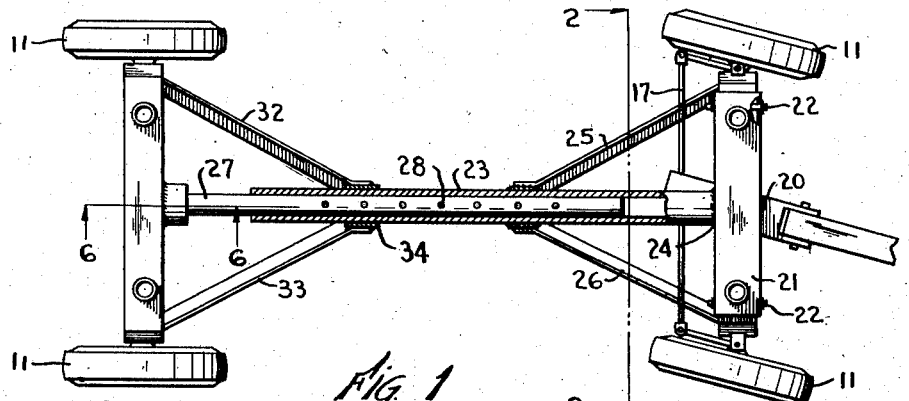
Fig. 1
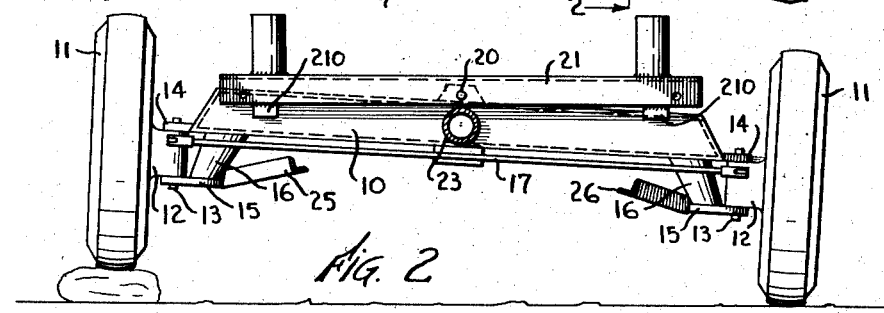
Fig. 2
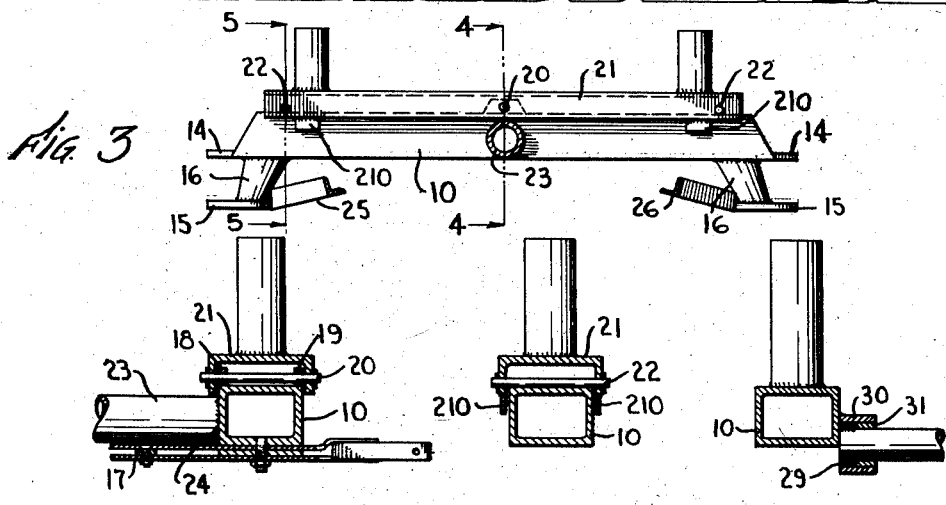
Fig. 3
Fig. 4    Fig. 5    Fig. 6
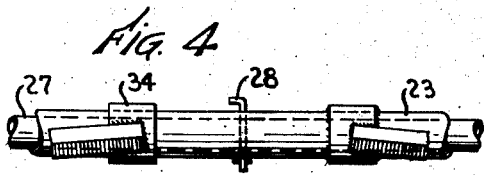
Fig. 7
Inventor
MILES F. MENG
By Wheeler, Wheeler & Wheeler
Attorneys

UNITED STATES PATENT OFFICE 2,675,247

VEHICLE CHASSIS CONSTRUCTION

Miles F. Meng, Osseo, Wis., assignor to Osseo Supply & Service Company, Osseo, Wis., a corporation of Wisconsin Application August 1, 1949, Serial No. 107,849

3 Claims. (Cl. 280—111)

This invention relates to a vehicle chassis construction.

It is the object of the invention to provide exceptional flexibility in a wagon having an adjustable reach, each of the axles being free to pivot independently of the other notwithstanding the adjustable feature and notwithstanding that the axles and the reach are adequately braced.

It is another object of the invention to provide further flexibility between the axles and the bed, the respective bolsters being pivoted to the axles and provided with means whereby they may readily be locked against tilting movement on their respective pivots.

It is a further object of the invention to provide a vehicle having great clearance, the respective axles having their central portions offset upwardly from the stub axles upon which the wheels are mounted.

In the drawings:

Fig. 1 is a view in plan of a chassis embodying the invention, portions of the reach being broken away to a horizontal section.

Fig. 2 is a view taken in section on the line 2—2 of Fig. 1.

Fig. 3 is a view of the axle and bolster shown in Fig. 2, the bolster being locked against tilting movement respecting the axle.

Fig. 4 is a view taken in section on the line 4—4 of Fig. 3 showing the welded connection of the reach to the front axle.

Fig. 5 is a view taken in section on the line 5—5 of Fig. 3.

Fig. 6 is an enlarged fragmentary detail view showing the swiveled connection of the reach to the rear axle.

Fig. 7 is an enlarged fragmentary detail view in side elevation of the intermediate portion of the reach.

The front axle 10 is typical of both axles, differing from the rear axle only in the provision of means by which the front wheels are made dirigible. Each axle is desirably made hollow in the form of a box beam which is offset upwardly from the axles of the wheels 11. These wheels are rotatably mounted on the dirigible axles 12 which are pivoted on upright steering pins 13. The upper ends of these pins are carried by the ears 14 which project from the lower end of surfaces of the axle 10, the bottoms of the pins being carried by plates 15 projecting from the horns 16 which extend downwardly below the ends of the axle, as best shown in Fig. 3. The usual tie rod at 17 connects the stub axles 12 to turn in unison for steering.

Upstanding centrally on the front axle 10 are the front and rear ears 18, 19 across which extends the pintle 20 upon which a bolster 21 is pivoted on the axle. The bolster desirably comprises an inverted channel as shown, the width of the channel being sufficient to receive the box axle 10. Thus, the front axle may tilt to either side to the extent indicated in Fig. 2 without affecting the level position of the bolster. Under some circumstances, where tilting is undesirable, I lock the bolster and axle against relative tilting by inserting the cross pins 22 into the apertures provided near the ends of the bolster, as best shown in Figs. 3 and 5. The position of the apertures is such that the cross pins will rest upon, or substantially upon, the front axle 10 thereby restraining the bolster from substantial tilting with respect to the underlying axle. Pairs of ears 210 are welded to the lower edges of the bolster 21. When the bolster is tipped as shown in Fig. 3, these ears provide additional lateral support on the end which is lifted away from the axle.

A wide range of adjustment is provided in the reach while, at the same time, the reach is braced to maintain it at right angles with the respective axles while accommodating complete freedom of tilting movement between the axles about the axis of the reach so that the passage of any wheel of the vehicle over a bump or into a hole will involve no strain on the rest of the vehicle.

It is important, for the complete elimination of strain, not only to provide for freedom of inclination of each axle respecting the other, but also to provide for free tilting of the bolster as above described, since a rigid bolster would tend to impose strain on the load in the event of extreme tilting of either axle respecting the other. With the bolster free, such stresses are avoided.

The reach element 23 is tubular and is welded to the front axle 10 at 24 being rigidly positioned by braces 25, 26, welded at their front ends to the axle and at their rear ends to the reach tube 23.

Telescopically adjustable in the tubular reach element 23 is the reach bar 27 which may be anchored in a desired position of adjustment by dropping the pin 28 through registering holes in reach elements 23 and 27. As shown in Fig. 6 the bar 27 has a swiveled connection with the rear axle, being provided with a head at 29 which fits within the sleeve 30 on the rear axle and is held therein by a collar 31 welded or brazed into sleeve 30 to confine head 29 against axial movement, while permitting free rotation.

The braces 32, 33 are welded at the rear ends to the rear axle and extend obliquely forwardly therefrom, and have their forward ends connected by welding or otherwise to a collar 34 which is both rotatable and telescopically slidable upon the tubular reach element 23. As the bar 27 moves telescopically within the tubular reach element 23, the collar 34 moves telescopically on the exterior thereof, both the bar and the collar being connected with the rear axle. However, in the matter of rotation, the collar 34 is independent of the bar 27, the bar 27 being constrained by pin 28 to take its rotative position from the tube 23, whereas the rear axle is freely tiltable about the axis of bar 27 due to the swivel connection best shown in Fig. 6, and the collar 34 partakes of the tilting self-adjustment of the rear axle as it traverses irregularities in the highway.

From the foregoing it is clear that the rear axle is free to pivot on the reach and that the front axle is rigidly connected to the reach. The front axle is, however, provided with the pivoted bolster 21. Accordingly, when the vehicle is loaded, tilting of the front axle has no effect on the load carried by the bolster and tilting of the rear axle likewise imposes no strain on the load as the bolster is free to tilt with the load in accordance with the movement of the rear axle.

I claim:

1. A vehicle comprising front and rear axles having terminal downward offsets provided with wheels, a tubular reach element rigidly connected with one of said axles and extending toward the other, brace means rigidly fixing said reach element substantially at right angles to the axle with which it is connected, a second reach element telescopically adjustable respecting the first mentioned reach element, latch means for fixing the adjustment of the reach elements, a head upon the second reach element and a socket upon the other of said axles having head confining means providing a swiveled connection between the second reach element and the last mentioned axle, and braces extending obliquely from the last mentioned axle toward the tubular reach element, and a collar mounted rotatably upon said tubular reach element and to which the ends of said last mentioned braces are connected, in further combination with a bolster member centrally pivoted upon the rigidly connected axle whereby either axle may tilt with respect to the other without materially stressing a load imposed on said vehicle, said bolster member comprising an inverted channel having flanges provided with registering apertures, a pintle bolt extending through the apertures, and upstanding ears on the axle in which said pintle bolt is engaged.

2. The device of claim 1, said bolster being provided with stop pin means comprising completely removable pins transversely spanning the channel adjacent its respective ends at a level for substantial contact with said axle, for restraining the pivoting movement of the bolster with respect to the axle.

3. The device of claim 1, said bolster flanges being downwardly directed to embrace said axle, said flanges having downward extensions near their ends remote from the pivot whereby to laterally guide the bolster on the axle during extremes of tilting movement of the bolster on the axle.

References Cited in the file of this patent

UNITED STATES PATENTS

| Number | Name | Date |
| --- | --- | --- |
| 1,120,036 | Dearing | Dec. 8, 1914 |
| 1,277,890 | Evans | Sept. 3, 1918 |
| 1,383,203 | Hartsock | June 28, 1921 |
| 1,886,722 | Oppenheim | Nov. 8, 1932 |
| 2,232,549 | McNamara | Feb. 18, 1941 |
| 2,400,803 | Barnhart | May 21, 1946 |
| 2,432,253 | Schaeffer | Dec. 9, 1947 |
| 2,523,790 | Thiel | Sept. 26, 1950 |